Feb. 27, 1934.                J. J. GILFOY                1,948,852
                    NOZZLE ATTACHMENT FOR AIR HOSES
                         Filed Aug. 19, 1932
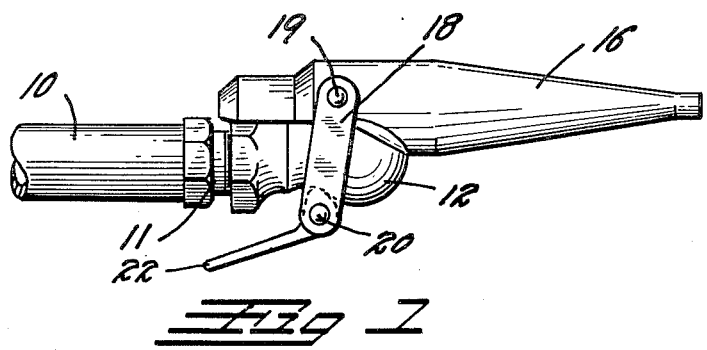
Fig. 1
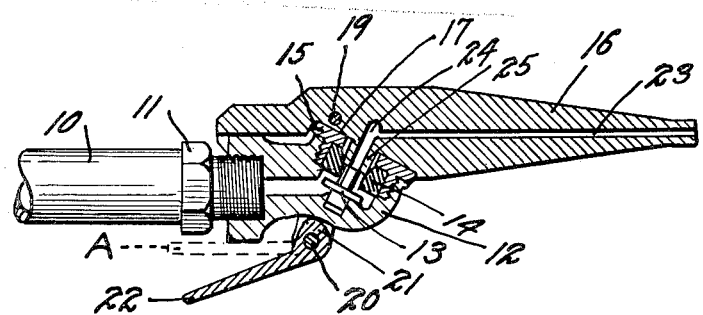
Fig. 2
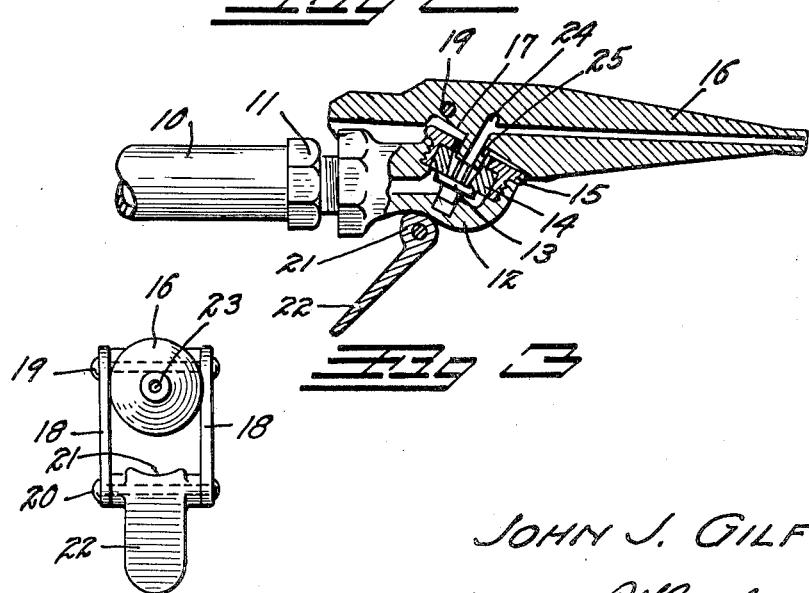
Fig. 3
Fig. 4
Inventor
JOHN J. GILFOY
By
Attorney Patented Feb. 27, 1934

1,948,852

UNITED STATES PATENT OFFICE 1,948,852

NOZZLE ATTACHMENT FOR AIR HOSES

John J. Gilfoy, Denver, Colo.

Application August 19, 1932. Serial No. 629,472

5 Claims. (Cl. 284—17)

This invention relates to a detachable nozzle for air hoses of the type employed for filling automobile tires. It is often desired to employ compressed air in and about a garage or filling station for cleaning automobiles, motors, radiators, work benches, spark plugs, etc. It is impossible to use the regular tire filling hose for this purpose since the tire filling hose terminates in a chuck arranged to deliver air only when placed upon an automobile tire valve. The principal object of this invention is to provide a detachable nozzle which can be quickly and easily placed upon the usual air hose chuck so as to open the valve of the chuck, and deliver the air in a jet to enable it to be used for other purposes than tire filling.

Another object of the invention is to so construct the device that it can be operated while in use to open and close the valve with which each air chuck is provided so as to control the air issuing from the detachable nozzle.

A further object is to so construct the device that it will be unnecessary to alter or change the present air chucks and so that it will not be necessary to employ tools of any nature or to attach or detach the improved nozzle.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates the appearance of the improved nozzle when in place upon the chuck extremity of a typical tire filling hose.

Fig. 2 illustrates a longitudinal section through the improved nozzle and through the air chuck to which the nozzle is applied. In this view the air chuck valve is illustrated in the open position.

Fig. 3 is a view similar to Fig. 2, except that the air chuck valve is illustrated in the closed position.

Fig. 4 is a front end view of the improved nozzle.

In the drawing typical parts of the usual tire filling hose are illustrated and indicated by numeral as follows: air hose 10, air hose nipple 11, valve chuck 12, chuck valve 13, valve washer 14, washer retaining cap 15.

To understand the invention it might be well to briefly explain the operation of a typical tire filling hose chuck. Normally the pressure of the air in the hose 10 presses the chuck valve 13 against the valve washer 14 so as to prevent leakage of the air. When the chuck is applied to a tire valve the valve washer 14 seals itself about the extremity of the tire valve and the stem of the tire valve acts to press the chuck valve 13 away from its washer 14 so as to allow the air to flow into the tire valve. When the chuck is removed, the air pressure immediately forces the chuck valve 13 against the valve washer 14, shutting off the air supply.

This invention comprises: a nozzle member 16 having a flat face 17 adapted to fit snugly against the washer retaining cap 15 of the chuck 12. The nozzle member 16 is held in place upon the chuck 12 by means of two hinged links 18 which extend from a pivot pin 19 in the nozzle member 16 to a second pin 20. A cam 21 is mounted on the second pin 20 and provided with an operating handle 22.

A central air passage 23 extends into the nozzle member 16, terminating at an angular air passage 24. A teat 25 projects from the center of the flat face 17. The angular air passage 24 terminates through the boss 25. When the nozzle 16 is in place on the chuck 12, the boss 25 occupies the position usually occupied by the extremity of the tire valve.

In use, the operator presses the boss 25 into the chuck 12 so that the flat face 17 will bear against the retaining cap 15. He then swings the links 18 rearwardly so that the cam 21 will pass around the rounded back of the chuck 12 until it occupies the position of Fig. 3. It will be noted that in the latter position, the chuck valve 13 is not depressed or opened so that no air can flow therefrom.

When the air is desired the operator depresses the handle 22 with his thumb to the position of Fig. 2. This swings the high point of the cam 21 against the back of the chuck 12 so as to cause the links 18 to clamp the nozzle member 16 against the chuck, thereby causing the boss 25 to press the chuck valve 13 to the open position of Fig. 2. Air will then flow from the hose 10 through the open valve and out the nozzle member 16. As soon as the pressure of the thumb is released on the handle 22, the air pressure will force the device to the closed position of Fig. 3.

Thus the operator has instant and convenient control of the air issuing through the nozzle member 16 at all times. If he desires to lock the device in the open position, he simply depresses the handle 22 to the broken line position "A" of Fig. 2. This will cause the cam 21 to pass its "dead center" position so that it can not be moved by the air pressure. The device is then locked open until it is desired to remove or close it. To remove the nozzle it is only necessary to snap the handle to release the cam then swing the links forward from the chuck. This can be easily and quickly accomplished with the fingers of one hand. The device can be loosened from the chuck until the cam is turned to the fully released position. It will not accidentally fall from the chuck while in use.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. Means for attaching a nozzle to an air hose chuck and operating the valve in the latter comprising: an angularly positioned face on said nozzle for contacting the face of said chuck; a valve operating projection on said angularly positioned face; a pair of links hinged to said nozzle for passing on each side of said chuck; a cam hinged between the free extremities of said links; and a handle member secured to said cam, the relation between said cam and said handle member being such that when said handle member is forced out of alignment with said links said projection will be drawn into said chuck and when swung into alignment with said links said cam will release said chuck so as to allow said nozzle to be removed therefrom.

2. Means for attaching a nozzle to an air hose chuck and operating the valve in the latter comprising: an angularly positioned face on said nozzle for contacting the face of said chuck; a valve operating projection on said angularly positioned face; a pair of links hinged to said nozzle for passing on each side of said chuck; a cam hinged between the free extremities of said links; and a handle member secured to said cam, said cam being notched so that when in one position it will pass over and release said chuck.

3. Means for attaching a nozzle to an air hose chuck and operating the valve in the latter comprising: a circular flat face on one side of said nozzle forming an acuate angle to the axis thereof for contacting the face of said chuck; a pivot pin passing through said nozzle rearwardly of the axis of said face; a link depending from each extremity of said pivot pin; a second pin joining the extremities of said links; a cam mounted on said second pin; and a handle member connected with said cam so as to cause the latter to engage said chuck to draw the rearward portion of said face against said chuck.

4. Means for attaching a nozzle to an air hose chuck and operating the valve in the latter comprising: a circular flat face on one side of said nozzle forming an acute angle to the axis thereof for contacting the face of said chuck; a pivot pin passing through said nozzle rearwardly of the axis of said face; a link depending from each extremity of said pivot pin; a second pin joining the extremities of said links; a cam mounted on said second pin; and a handle member connected with said cam so as to cause the latter to engage said chuck to draw the rearward portion of said face against said chuck; a concentric boss projecting from said face and adapted to enter said chuck to hold said face in position thereon.

5. Means for attaching a nozzle to an air hose chuck and operating the valve in the latter comprising: a circular flat face on one side of said nozzle forming an acute angle to the axis thereof for contacting the face of said chuck; a pivot pin passing through said nozzle rearwardly of the axis of said face; a link depending from each extremity of said pivot pin; a second pin joining the extremities of said links; a cam mounted on said second pin; and a handle member connected with said cam so as to cause the latter to engage said chuck to draw the rearward portion of said face against said chuck; a concentric boss projecting from said face and adapted to enter said chuck to hold said face in position thereon; and a rearwardly extending boss on said nozzle provided with a groove to fit over said chuck.

JOHN J. GILFOY.